United States Patent [19]

Kunieda et al.

[11] Patent Number: 4,968,115

[45] Date of Patent: Nov. 6, 1990

[54] POLYMER CLAD QUARTZ OPTICAL FIBER CORD

[75] Inventors: Hidekazu Kunieda; Masanori Takeuchi, both of Shiga, Japan

[73] Assignee: Toray Industries, Inc., Japan

[21] Appl. No.: 368,227

[22] Filed: Jun. 19, 1989

[30] Foreign Application Priority Data

Jul. 1, 1988 [JP] Japan ................. 63-165686

[51] Int. Cl.$^5$ ............................................... G02B 6/22
[52] U.S. Cl. .................................. 350/96.33; 350/96.30
[58] Field of Search .......................... 350/96.29–96.34

[56] References Cited

U.S. PATENT DOCUMENTS

| | | | |
|---|---|---|---|
| 4,239,335 | 12/1980 | Stiles | 350/96.30 X |
| 4,690,502 | 9/1987 | Zimmerman et al. | 350/96.33 X |
| 4,733,941 | 3/1988 | Broder et al. | 350/96.33 |
| 4,737,012 | 4/1988 | Murakami et al. | 350/96.30 X |
| 4,795,234 | 1/1989 | Nakasone et al. | 350/96.30 |

*Primary Examiner*—John D. Lee
*Attorney, Agent, or Firm*—Austin R. Miller

[57] ABSTRACT

A polymer clad quartz optical fiber cord comprising a core of quartz glass, a clad of an organic polymer surrounding said core, a protective layer surrounding said clad and a covering layer surrounding said protective layer, and an organic polymeric tension fiber disposed between said protective layer and said covering layer characterized in that the cross-sectional structure of said cord satisfies the following formula:

$$4 \leq \alpha \qquad (I)$$

$$\text{provided } \alpha = \left(\frac{D4}{D3}\right)^2 - \left[\left(\frac{0.012}{D3}\right)^2 \times \frac{d}{\rho}\right] - 1$$

where D3 represents the outer diameter (in mm) of said protective layer, D4 represents the inner diameter (in mm) of the covering layer, d represents the denier number of the tension fiber and is an integer from 1,000 to 5,000, and $\rho$ represents the relative density of the tension fiber.

15 Claims, 1 Drawing Sheet

POLYMER CLAD QUARTZ OPTICAL FIBER CORD

TECHNICAL FIELD

This invention relates to a polymer clad quartz optical fiber cord with an organic polymer as a clad. More specifically, it relates to a polymer clad quartz optical fiber cord which has improved light transmittance at low temperature.

BACKGROUND ART

The polymer clad quartz optical fiber has better light transmittance than the polymer core optical fiber. Further, it has a clad composed of an organic polymer and thus has better handling performance than glass clad optical fibers including better flexibility, allowing fabrication in larger diameters, and is therefore suitable for short or medium distance communications under severe environmental conditions as in factories.

For the composition of such polymer clad quartz optical fiber, a fiber having the core comprised of quartz glass and a clad comprised of a silicone resin is known.

However, for practical application, it is required to provide a cord structure with a covering layer disposed over the polymer clad quartz optical fiber in order to protect the clad quartz optical fiber from external excitation. For this reason a cord having a polymer clad quartz optical fiber, covered by a thermoplastic resin such as nylon resin, is known.

However, conventional polymer clad quartz optical fiber cords have had the shortcoming that, as the core was comprised of quartz glass while the clad and the protective or covering layer was formed of an organic polymer, these components had greatly different coefficients of thermal expansion. In a lower temperature region the organic polymer would shrink and the shrinking stress would apply a strain to the quartz to reduce the light transmittance of the optical fiber.

This shortcoming was particularly noticeable in a cord having a thermoplastic resin employed for the sake of economy or ease of control of covering thickness. When the cord structure was employed, the transmission loss at low temperature would increase more than that of the polymer clad quartz optical fiber comprised of only core and clad, precluding use of the thermoplastic resin under severe temperature conditions.

To solve this problem, the expedient of enlarging the inner diameter of the covering layer was proposed. However simply doing this causes an inferior relationship between the tension fibers and the optical fiber because of too loose packing of the tension fibers. Further, the optical fiber cord of this invention needs to easily be inserted in and connected with a connector, so its outer diameter must be determined relative to the inner diameter of the connector. Therefore, enlarging the inner diameter of the covering layer inevitably brings about too small thickness of the covering layer and causes insufficient protection by the covering layer.

An important object of the present invention is to provide a polymer clad quartz optical fiber cord which overcomes the problems just discussed. Another object is to provide a way of avoiding an increase of transmission loss of the polymer clad quartz optical fiber cord at lower temperatures. Still another object is to provide a cord which has a sufficient resisting force to drawing in wiring work and is thus distinguished in handling performance and workability, keeping its outer diameter at a known uniform and desired dimension so that it can be easily connected with an ordinary connector.

The foregoing and other objects of this invention, including the simplicity and economy of the same and the ease with which it may be applied to cords of different sizes, shapes and combinations, will further become apparent hereinafter in the drawings, of which:

The Figure is a cross-sectional view of a polymer clad quartz optical fiber cord comprising one embodiment according to this invention.

SUMMARY OF THE INVENTION

Although specific terms will be used in the description which follows, these terms are intended to be applied to the specific form of the invention selected for illustration in the drawings, and are not intended to define or restrict the scope of the invention, which is defined in the appended claims.

Referring to the drawing, a polymer clad quartz optical fiber cord comprising a core (1) comprised of quartz glass is surrounded by a clad (2) which comprises an organic polymer. A protective layer (3) and a covering layer (4) are concentrically disposed over said core (1) and a tension fiber (5) comprised of an organic polymeric fiber is disposed between protective layer (3) and covering layer (4). The cross-sectional structure of the cord satisfies the following formula (I)

$$4 \leqq \alpha \tag{I}$$

$$\text{provided } \alpha = \left(\frac{D4}{D3}\right)^2 - \left\{\left(\frac{0.012}{D3}\right)^2 \times \frac{d}{\rho}\right\} - 1$$

where D3 represents the outer diameter (in mm) of the protective layer (3), D4 the inner diameter (in mm) of the covering layer (4), and d the denier number of the tension fiber (5) or an integer from 1,000 to 5,000 and $\rho$ is the relative density of the tension fiber.

In the above formula, $\alpha$ designates the cross-sectional area that is unoccupied by the fibers which comprise the tension layer (5) between the protective layer (3) and the covering layer (4), based on the cross-sectional area of the protected optical fiber.

DETAILED DESCRIPTION OF THE INVENTION

Figure 1:
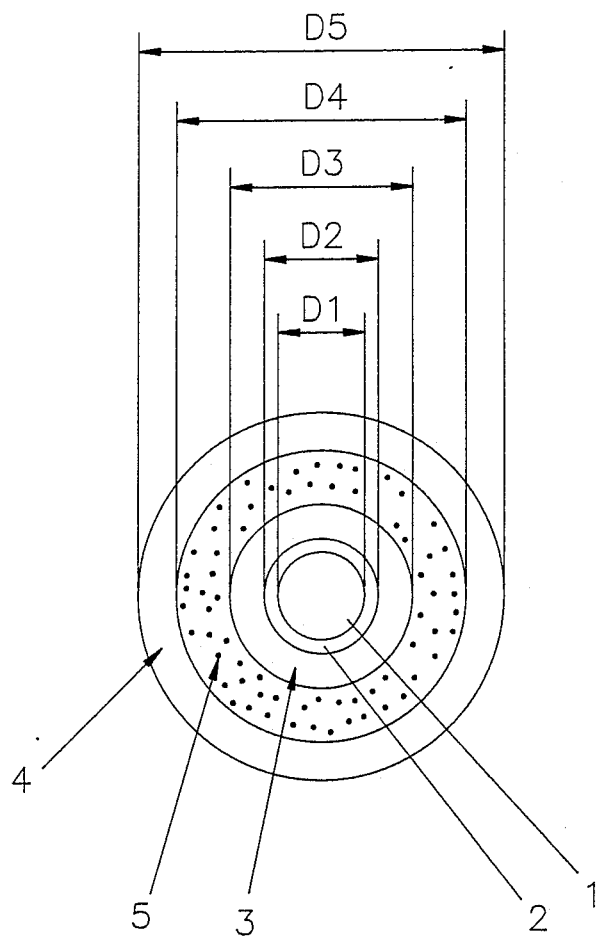

In FIG. 1, core 1 comprised of quartz glass (for example, its outer diameter may be 200 microns) has a clad 2 concentrically disposed thereover to form an optical fiber. This clad 2 is comprised of a transparent organic polymer having a refractive index smaller than that of the quartz in the core 1 by 0.3 percent or more. Specifically, such polymer may be a fluorine containing polymer such as an ultraviolet ray hardening fluorine containing acrylate polymer, but is not limited thereto.

Over said clad 2, a protective layer 3 (having, for example, an outer diameter of 0.5 mm) is concentrically disposed around the clad 2. This protective layer 3 is designed to protect the core 1 from light transmittance and the clad 2 from external dynamic excitation and contamination, and is preferably distinguished in its mechanical characteristics.

It is preferable that the protective layer 3 has a tensile modulus of 500 kg/mm$^2$ or higher. Specifically, nylons and tetrafluoroethylene copolymers may be used.

The outer diameter of the protective layer 3 is preferably 1.4 times or more but 2.5 times or less than the core diameter. If its diameter is less than 1.4 times, the thickness is not sufficient to serve as a protective layer and protect the polymer clad quartz optical fiber from external excitation. If its diameter exceeds 2.5 times, the thickness becomes too great, resulting in less flexibility and greater shrinkage stress of the protective layer under low temperature, thus increasing the transmission loss of the polymer clad quartz optical fiber. It is, therefore, preferable to satisfy formula (II), or $$1.4 < \beta < 2.5 \quad (II)$$

provided $\beta = D3/D1$ where D3 represents the outer diameter (in mm) of the protective layer (3), and D1 represents the outer diameter (in mm) of the core (1).

Further, over the protective layer (3), a covering layer (4) is disposed concentrically with said protective layer. Also, between the outer periphery of said covering layer (3) and the inner periphery of said covering layer (4), tension fibers (5) comprised of an organic polymer fiber are disposed. Here, it is necessary that the sizes of these layers satisfy the formula (I) below.

$$4 \leq \alpha \quad (I)$$

provided $\alpha = \left(\dfrac{D4}{D3}\right)^2 - \left[\left(\dfrac{0.012}{D3}\right)^2 \times \dfrac{d}{\rho}\right] - 1$ $$1.5 < \gamma < 1.8 \quad (III)$$
provided $\gamma = D5/D4$ where D3 represents the outer diameter (in mm) of the protective layer, D4 represents the inner diameter (in mm) of the covering layer, and D5 represents the outer diameter (in mm) of the covering layer, and d is the denier number of the tension fiber and is an integer of from 1,000 to 5,000, and $\rho$ represents the relative density of the tension fiber.

Providing $\rho$ is about 1.4 as is the case, for example, with the aramide fiber "Kevlar", the above formula (I) can substantially be abbreviated as the following formula (I').

$$4 \leq \alpha' \quad (I')$$

provided $\alpha' = \left(\dfrac{D4}{D3}\right)^2 - \left[\left(\dfrac{0.01}{D3}\right)^2 \times d\right] - 1,$ where $\alpha'$ is the same as $\alpha$ but means the cross sectional area that is unoccupied by the tension fibers having a density of 1.4.

In formula (I) or (I'), if $\alpha$ or $\alpha'$ is smaller than 4.0 it means that the clearance between the protective layer (3) and the covering layer (4) is too small so that the stress of shrinkage of the covering layer (4) at low temperature is imposed upon the protective layer (3) to cause a strain in the core and thus increases the transmission loss of the polymer clad quartz optical fiber. If $\alpha$ or $\alpha'$ is too great, the polymer clad quartz optical fiber (1) is easily broken before the breakage of the tension fibers (5) because the protective layer (3) is apt to move freely under the covering layer (4) so that the effect of protecting the polymer clad quartz optical fiber (1) by the tension fibers (5) is not ensured. In other words, the beneficial effect of the tension fibers (5) is wholly or partially lost, resulting in breakage of the polymer clad optical fiber at the time of drawing while performing wiring work. Especially, for a polymer clad quartz optical fiber having an outer diameter of 150 to 250 microns, $\alpha$ or $\alpha'$ should preferably be 4 to 10.

In formula (III), if $\gamma$ is smaller than 1.5, the protective effect of the covering layer is not fully exhibited, and if $\gamma$ is greater than 1.8, the polymer clad quartz optical fiber cord has its weight unduly increased, resulting in poor economy. In addition, the stress of shrinkage at low temperatures exerts an influence on the protective layer (3) to apply a strain to the core and thus to increase the transmission loss of the polymer clad quartz optical fiber.

Regarding the composition of the covering layer (4), at least one polymer selected from the group consisting of polyurethane, polyester elastomer, poly(vinyl chloride), polyethylene and polypropylene may be chosen, among others, and the tension fiber is an organic polymer fiber having a tensile modulus of at least 500 kg/cm$^2$ or more. Among such polymer fibers there may be listed polyaramid, polyamide, polyimide, polyester, high strength polyethylene, carbon fibers, high strength polyacrylonitrile and high strength poly(vinyl alcohol).

According to the present invention, the following effects are provided.

(1) The cord has distinguished performance for light transmittance at low temperature.

(2) It has strength against tension and is resistant to damage even after drawing in wiring work.

(3) It has a protective layer which is of a great elastic modulus and is therefore economical in that the thickness of the protective layer can be reduced.

(4) On account of the protective layer of great elastic modulus, the effect of protecting the fiber is enhanced, allowing a greater degree of freedom of design of the covering layer.

(5) As the thickness of the covering layer can be reduced, the cord is lightweight and economical.

The present invention will now be described in more detail in reference to specific examples, which are not intended to limit the scope of the invention.

EXAMPLE 1

Using an aramid fiber having a tensile modulus of 1300 kg/mm² as the tension fiber, a polymer clad quartz optical fiber cord was fabricated with poly(vinyl chloride) used for the covering layer. The polymer clad quartz optical fiber employed was comprised of a core of pure quartz of 200 μm diameter, a clad of UV-curable fluorinated polyacrylate of a clad thickness of 15μ and a clad diameter of 230 μm disposed over the core, and a tetrafluoroethylene-ethylene copolymer having a tensile modulus of 1,000 kg/mm² and having an outer diameter of 0.5 mm positioned to serve as a protective layer. Over this polymer clad quartz optical fiber, five strands of a tension fiber comprised of 380 denier aramid fiber were disposed in such a way as to encircle the polymer clad quartz optical fiber, and they were covered by a covering layer of poly(vinyl chloride) in an outer diameter of 2.2 mm and an inner diameter of 1.34 mm. Under such configuration, the value of $\alpha$ in formula (I) expressing the cross-sectional structure of the cord was 5.42.

Also, the value of $\beta$ in formula (II) and that of $\gamma$ in formula (III) were 2.5 and 1.6 respectively.

The polymer clad quartz optical fiber was disposed at the center of the concentrically formed cord and was not in direct contact with the covering layer, and the poly(vinyl chloride) covering had a smooth surface. The transmission loss at 25° C. was 4 dB/km, same with that of the polymer clad quartz optical fiber before it was fabricated into the cord. Placing 1 km of this cord in a thermostat, and using an LED light source and a light power meter, the quantities of light transmission after treatment at 25° C. for 8 hours and at −40 20 C. for 8 hours were determined, and it was found that the change of the quantity of light transmission between 25° C. and −40° C. was very slight, giving an increase of only 1.0 dB/km of transmission loss based on the amount of light transmission at 25° C. Thus, the cord was proved to have excellent low temperature performance for light communication.

REFERENCE EXAMPLE 1

Using a polymer clad quartz optical fiber similar to that in Example 1, an aramid fiber was disposed over the same optical fiber, and this aramid fiber was covered with poly(vinyl chloride) to fabricate a cord having an outer diameter of 2.2 mm and an inner diameter of 1.0 mm for optical communication. The value of $\alpha$ expressing the cross-sectional configuration of the cord was 2.22, and the value of $\beta$ in formula (II) and that of $\gamma$ in formula (III) were 2.5 and 2.2 respectively.

The cord was subjected to a temperature test as in Example 1, and the quantity of light was proved to have changed greatly by 7.0 dB/km in reference to the value at 25° C., and the product was found to be inadequate for use as a cord for optical communication.

EXAMPLES 2-5, REFERENCE EXAMPLES 2 AND 3

Example 1 was repeated using different values for the inner diameter of the covering layer and the thickness of the tension fiber. The values used are summarized in Table 1. The results of temperature tests and impact breaking tests by dropping the obtained cords are also shown in Table 1.

EXAMPLE 6 AND REFERENCE EXAMPLE 4

Example 1 was repeated wherein the polymer clad quartz optical fiber was replaced by one having a core diameter of 110 microns and a protective layer diameter of 250 microns. The results are also shown in Table 1.

EXAMPLE 7 AND REFERENCE EXAMPLE 5

Example 1 was repeated wherein the polymer clad quartz optical fiber was replaced by one having a core diameter of 300 microns and a protective layer diameter of 500 microns. The results are also shown in Table 1.

TABLE 1

| Example No. | D1 (μ) | D3 (μ) | D4 (mm) | D5 (mm) | Tension Fiber (denier)* | α | β | γ | Transmission** Loss (dB/km) | Impact*** Strength |
|---|---|---|---|---|---|---|---|---|---|---|
| Ex. 2 | 200 | 500 | 1.30 | 2.2 | 1900 | 5.00 | 2.5 | 1.7 | 1.2 | 10 |
| Ex. 3 | 200 | 500 | 1.60 | 2.8 | 4560 | 7.42 | 2.5 | 1.75 | 0.3 | 9 |
| Ex. 4 | 200 | 500 | 1.64 | 2.8 | 4560 | 7.93 | 2.5 | 1.71 | 0.1 | 9 |
| Ref. 2 | 200 | 500 | 0.90 | 2.2 | 1900 | 1.48 | 2.5 | 2.40 | 8.0 | 20 |
| Ex. 5 | 200 | 500 | 1.80 | 2.2 | 4560 | 10.14 | 2.5 | 1.22 | 0.0 | 6 |
| Ref. 3 | 200 | 500 | 3.50 | 3.9 | 4560 | 46.18 | 2.5 | 1.11 | 0.0 | 1 |
| Ex. 6 | 110 | 250 | 1.30 | 2.2 | 1900 | 23.0 | 2.3 | 1.69 | 0.0 | 9 |
| Ref. 4 | 110 | 250 | 0.70 | 2.2 | 1900 | 3.8 | 2.3 | 3.14 | 6.9 | 24 |
| Ex. 7 | 300 | 500 | 1.34 | 2.2 | 1900 | 5.42 | 1.67 | 1.64 | 1.0 | 9 |
| Ref. 5 | 300 | 500 | 1.0 | 2.2 | 1900 | 2.24 | 1.67 | 2.20 | 7.5 | 18 |

*"Kevlar" (DuPont) was used as the tension fiber
**Increase of the transmission loss at −20° C. relative to that of 25° C.
***Fiber Optical Shock Test, EIA Standard RS-455-25 (number of impacts before losing light transmission by dropping 1 kg and 20 mm diameter column on the cord from 500 mm above the cord).

Although considerable emphasis has been applied to aramid fibers such as "Kevlar" in the foregoing description, the invention applies with full effect to other high strength fibers such as carbon fibers, high strength polyethylene fibers, high strength polyvinyl alcohol fibers, high strength acrylonitrile fibers and others.

Although this invention has been described with respect to specific layers and materials combined in particular sequences in the interest of clarity of understanding, it will be understood and appreciated that equivalent layers, materials and sequences may be used, some with reversals of order, without departing from the spirit and scope of this invention, which is defined in the appended claims.

We claim:

1. A polymer clad quartz optical fiber cord comprising a core of quartz glass, a clad of an organic polymer surrounding said core, a protective layer surrounding said clad and a covering layer surrounding said protective layer, and an organic polymeric tension fiber disposed between said protective layer and said covering layer, characterized in that the cross-sectional structure of said cord satisfies the following formula:

$$4 \leq \alpha \tag{I}$$

$$\text{provided } \alpha = \left(\frac{D4}{D3}\right)^2 - \left[\left(\frac{0.012}{D3}\right)^2 \times \frac{d}{\rho}\right] - 1$$

where D3 represents the outer diameter (in mm) of said protective layer, D4 represents the inner diameter (in mm) of the covering layer, d represents the denier number of the tension fiber and is an integer from 1,000 to 5,000, and $\rho$ represents the relative density of the tension fiber.

2. A polymer clad quartz optical fiber cord as set forth in claim 1, wherein the cross-sectional structure of said cord satisfies the following formula:

$$4 \leq \alpha \leq 40$$

3. A polymer clad quartz optical fiber cord as set forth in claim 1, wherein the cross-sectional structure of said cord satisfies the formula:

$$4.5 \leq \alpha \leq 10$$

4. A polymer clad quartz optical fiber as set forth in claim 1, wherein the diameter of the core is 150–250 microns and the cross-sectional structure of said cord satisfies the formula:

$$4 \leq \alpha \leq 10$$

5. A polymer clad quartz optical fiber cord as set forth in claim 1, wherein the cross-sectional structure of said cord satisfies the following formula $$4 \leq \alpha' \leq 40$$

6. A polymer clad quartz optical fiber cord as set forth in claim 1, wherein the cross-sectional structure of said cord satisfies the following formula $$4.5 \leq \alpha' \leq 10$$

7. A polymer clad quartz optical fiber as set forth in claim 1, wherein the diameter of the core is 150–250 microns and the cross-sectional structure of said cord satisfies the following formula $$4 \leq \alpha' \leq 10$$

8. A polymer clad quartz optical fiber cord comprising a core comprised of quartz glass, a clad comprised of an organic polymer, a protective layer and a covering layer concentrically disposed over said core, and a tension fiber layer comprised of an organic polymeric fiber and disposed between said protective layer and said covering layer, characterized in that the cross-sectional structure of said cord satisfies the relation of the following formula (I').

$$4 \leq \alpha' \tag{I'}$$

$$\text{provided } \alpha' = \left(\frac{D4}{D3}\right)^2 - \left[\left(\frac{0.01}{D3}\right)^2 \times d\right] - 1$$

where D3 represents the outer diameter (in mm) of the protective layer, D4 represents the inner diameter (in mm) of the covering layer, and d represents the denier number of the tension fiber and is an integer from 1,000 to 5,000.

9. A polymer clad quartz optical fiber cord as set forth in either of claim 1 or 8, wherein the diameter of the core is 100–300 microns.

10. A polymer clad quartz optical fiber cord as set forth in either of claim 1 or 8, wherein the clad comprises a polymer cured by ultra violet radiation.

11. A polymer clad quartz optical fiber cord as set forth in either of claim 1 or 8, wherein the protective layer comprises an organic polymer having tensile modulus of 500 kg.mm$^2$ or greater.

12. A polymer clad quartz optical fiber cord as set forth in either of claim 1 or 8, wherein the covering layer comprises a thermoplastic resin.

13. A polymer clad quartz optical fiber cord as set forth in either of claim 1 or 8, wherein the tension fiber has a tensile modulus of 5,000 kg/mm$^2$ or greater.

14. A polymer clad quartz optical fiber cord as set forth in either of claim 1 or 8, where the proportion of the outer diameter of the protective layer to the outer diameter of the core comprised of quartz glass, or $\beta$, satisfies the following formula (II)

$$1.4 \leq \beta \leq 2.5 \tag{II}$$

provided $\beta = D3/D1$ wherein D3 represents the outer diameter (in mm) of the protective layer and D1 the outer diameter (in mm) of the core.

15. A polymer clad quartz optical fiber cord as set forth in either of claim 1 or 8, where the proportion of the inner diameter to the outer diameter of the covering layer, or $\alpha$, satisfies the following formula (III)

$$1.5 < \gamma < 1.8 \tag{III}$$

provided $\gamma = D5/D4$ wherein D5 represents the outer diameter (in mm) of the covering layer and D4 represents the inner diameter (in mm) of the covering layer.

* * * * *